United States Patent [19]

Zuvela

[11] 4,157,619
[45] Jun. 12, 1979

[54] INCLINATION AND DIRECTION RESPONSIVE APPARATUS

[75] Inventor: Bernard R. Zuvela, Fountain Valley, Calif.

[73] Assignee: Scientific Drilling Controls, Newport Beach, Calif.

[21] Appl. No.: 842,041

[22] Filed: Oct. 14, 1977

[51] Int. Cl.² .................. G01C 9/06; G01C 17/30
[52] U.S. Cl. ........................ 33/352; 33/310; 33/313; 33/366; 33/361
[58] Field of Search .............. 33/302, 304, 312, 313, 33/352, 355, 356, 357, 361, 366, 310, 351, 353; 73/189

[56] References Cited

U.S. PATENT DOCUMENTS

| | | | |
|---|---|---|---|
| 1,980,100 | 11/1934 | Schlumberger | 33/312 |
| 3,778,703 | 12/1973 | Jackson | 33/361 |
| 3,888,201 | 6/1975 | Zuvela | 33/361 |
| 3,937,078 | 2/1976 | Williams | 33/352 |

FOREIGN PATENT DOCUMENTS 831637  1/1970  Canada ...................... 33/361

Primary Examiner—Richard E. Aegerter
Assistant Examiner—John W. Shepperd
Attorney, Agent, or Firm—William P. Green

[57] ABSTRACT

An inclination responsive device including a coil energized to produce a magnetic field extending along a normally vertical axis of the device, and a flux gate assembly adapted to respond to a horizontal component of that field upon tilting movement of the axis to an inclined non-vertical position, and to thereby produce an output which varies in response to changes in inclination. The flux gate assembly is desirably also responsive to the earth's magnetic field or another ambient field to also produce an output representing directional orientation of the device with respect to the ambient field.

20 Claims, 11 Drawing Figures

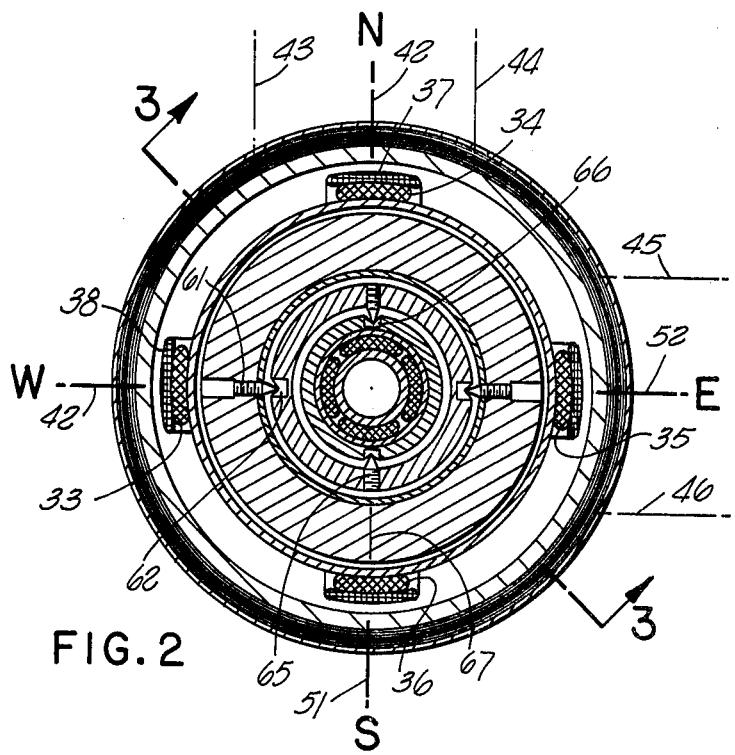
FIG. 2
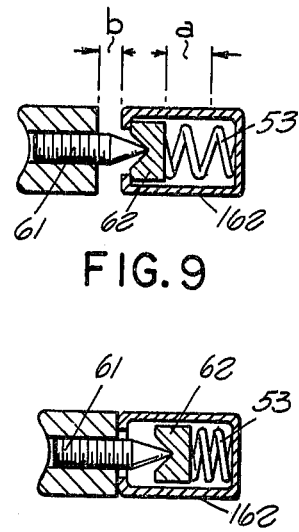
FIG. 9
FIG. 10
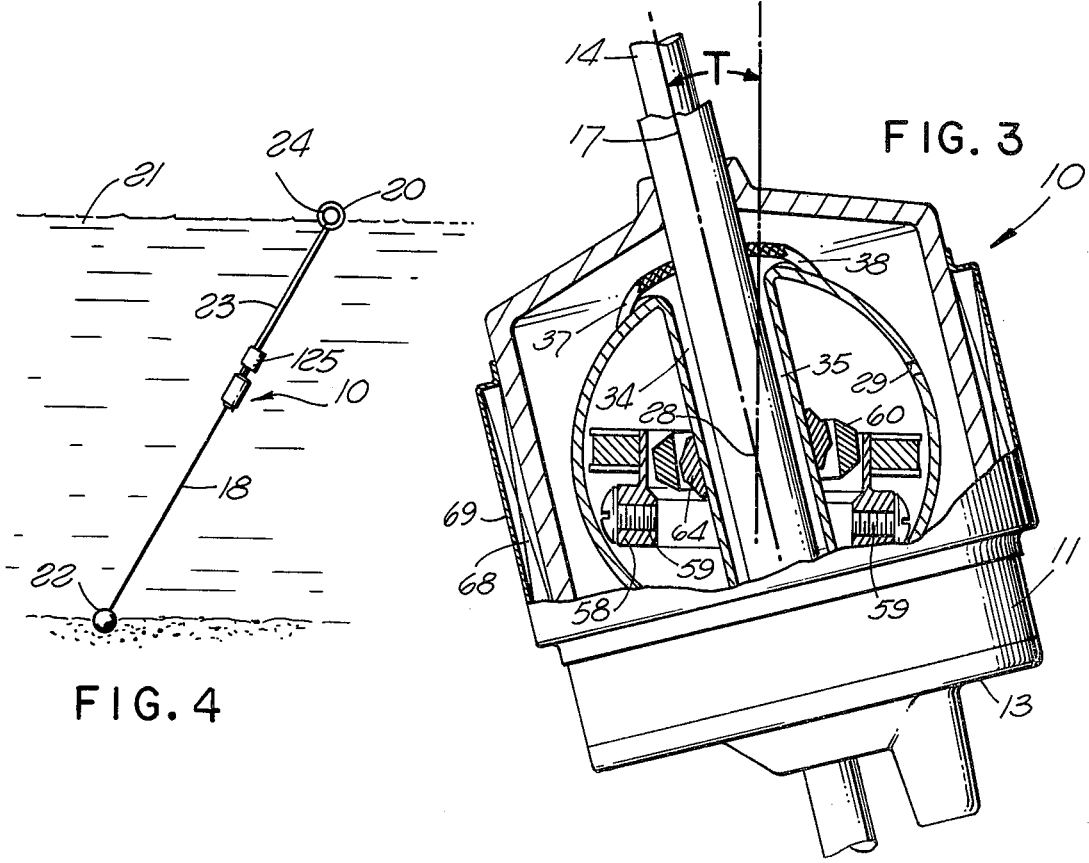
FIG. 3
FIG. 4

INCLINATION AND DIRECTION RESPONSIVE APPARATUS

BACKGROUND OF THE INVENTION

This invention relates to improved devices responsive to changes in inclination, and desirably also responsive to changes in directional orientation with respect to the earth's magnetic field or another ambient field.

Various types of inclinometers have been proposed in the past for use in wells or other environments in which it is desirable to determine accurately the tilt or inclination of a device with respect to the vertical. One common type of inclinometer utilizes photographic equipment for actually taking a picture of a pendulum actuated inclination responsive unit in a well. Such equipment, however, has several disadvantages, including the requirement that the equipment be withdrawn completely from the well in order to read the photograph. Other devices have utilized strain gauges or the like for responding to forces developed in a weighted structure when it tilts from a normal vertical position, as for instance in U.S. Pat. No. 3,791,043. In the apparatus of that patent, inclination response is obtained by such strain gauges, while response to changes in directional orientation of the device with respect to the earth's magnetic field or another ambient field is achieved by a flux gate assembly subjected to that field. Such an assembly may include coils flux linked to a core or cores of paramagnetic material driven periodically to a magnetically saturated state by a periodically fluctuating electrical current, preferably an alternating current, which energizes a portion of the coil structure. A part or all of the coil structure responds to the saturation by producing the desired output representing the direction of the ambient magnetic field. My co-pending application Ser. No. 736,126, filed Oct. 27, 1976, shows another such flux gate arrangement, in which the core desirably takes the form of a ring of paramagnetic material, rather than two pairs of mutually perpendicular cores as in U.S. Pat. No. 3,791,043.

SUMMARY OF THE INVENTION

The present invention provides an improved inclination responsive unit which operates magnetically to develop an output responsive to movement of a predetermined normally vertical axis of the device to positions in which the axis is inclined with respect to the vertical. To achieve this result, I provide the device with a special inclination coil which is so positioned and energized as to produce a magnetic field extending essentially along the discussed normally vertical axis of the device, with the coil being carried by the device to tilt with it to differently inclined positions. Such tilting movement of the normally vertical field gives to that field a horizontal component, whose strength varies in correspondence with the degree of inclination of the device. In conjunction with the inclination coil, I utilize means responsive to the horizontal component of the field produced by the coil, and acting to develop an output varying with the strength of the horizontal component and therefore varying in response to changes in inclination.

The means for responding to the horizontal component of the field developed by the inclination coil is preferably a flux gate assembly, and desirably functions also to produce an output varying in correspondence with changes in directional orientation of the device with respect to an ambient field. The flux gate assembly can operate in one condition of the apparatus to produce a combined output representing the intensity of both the earth's field or other ambient field and the horizontal component or components of the field produced by the inclination coil.

It is contemplated broadly that the invention can be applied to flux gates utilizing any conventional type of core, such as straight bar cores or ring cores, but the presently preferred arrangement is one utilizing a ring core, and desirably a ring core which is mounted for leveling movement relative to the associated flux gate coils in the manner desribed in my above-identified co-pending application, Ser. No. 736,126.

BRIEF DESCRIPTION OF THE DRAWINGS

The above and other features and objects of the invention will be better understood from the following detailed description of the typical embodiments illustrated in the accompanying drawings in which:

FIG. 2 is a reduced scale horizontal section taken on line 2—2 of FIG. 1;

FIG. 3 is a side view, partially broken away on line 3—3 of FIG. 2, showing the device in an inclined position;

FIG. 4 is a diagrammatic representation of the device as used on a buoy line;

FIG. 9 is an enlarged section on line 9—9 of FIG. 1;

FIG. 10 shows the parts of FIG. 9 under shock conditions; and

DESCRIPTION OF THE PREFERRED EMBODIMENTS

Figure 1:
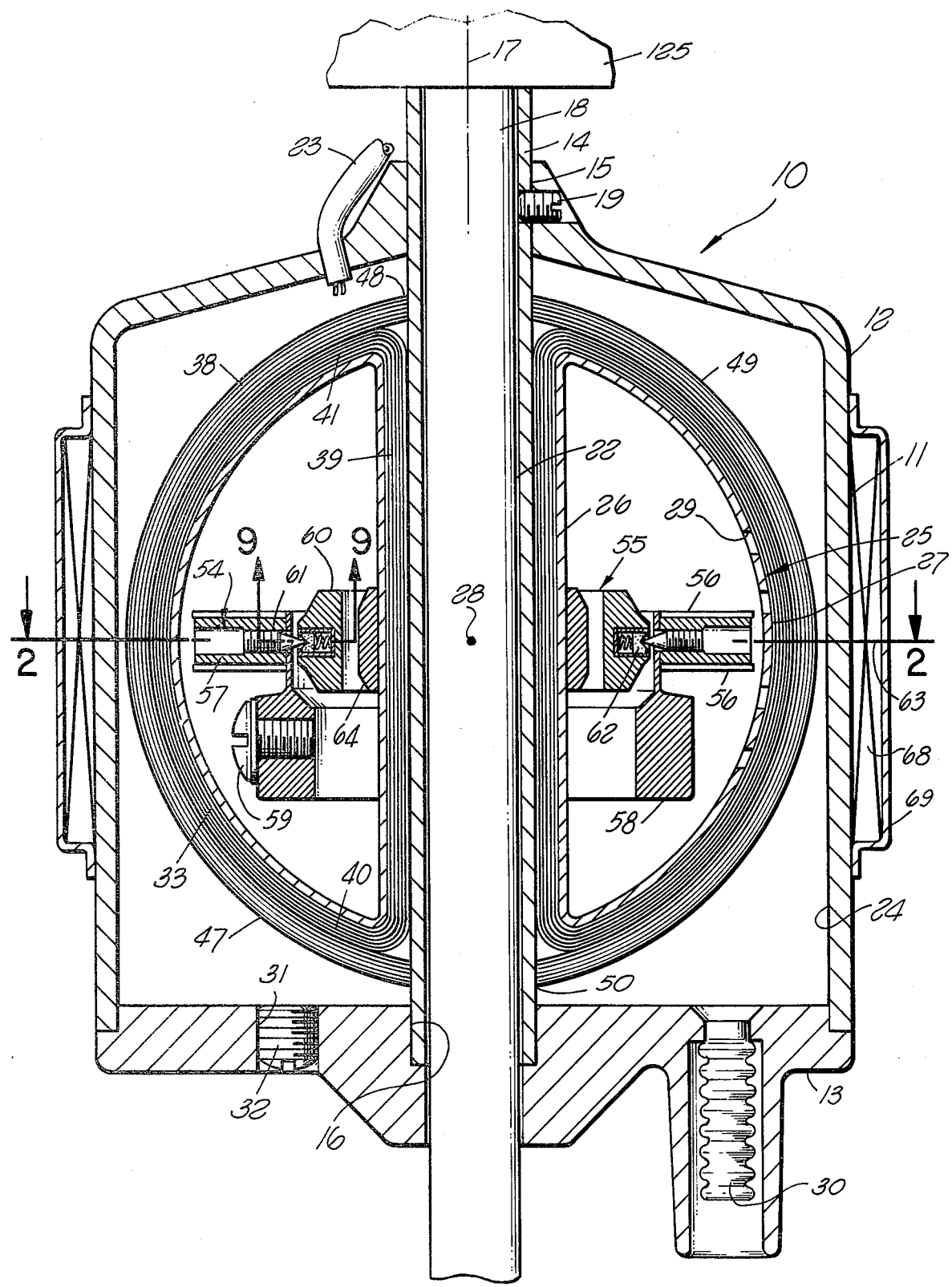
FIG. 1 is a vertical section through an inclination and direction responsive unit constructed in accordance with the invention, with the device illustrated in a directly vertical zero inclination setting.
Figure 5:
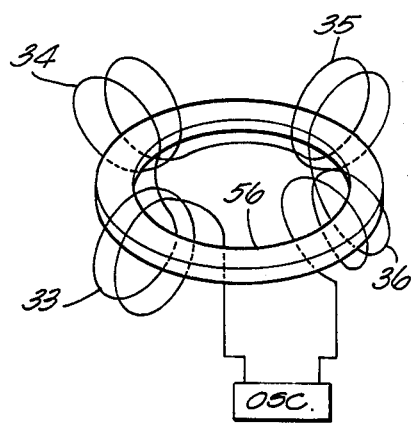
FIG. 5 is a diagrammatic representation of the inner primary or input coils of the device.
Figure 6:
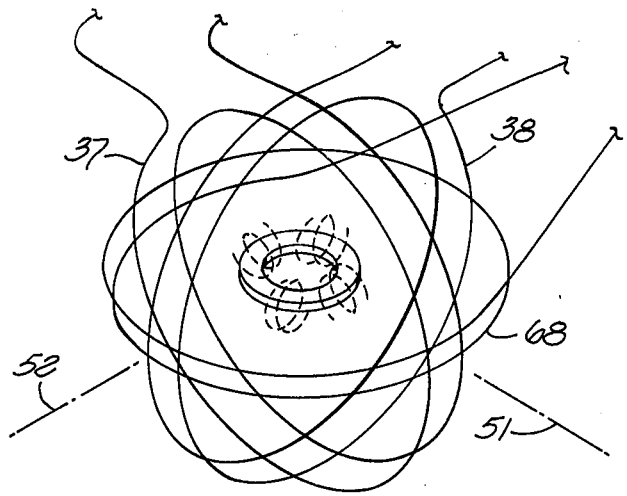
FIG. 6 shows diagrammatically the output or secondary coils and the surrounding inclination coil.

In FIG. 1, I have represented at 10 a unit embodying the invention which may be employed as both an inclinometer and compass for sensing both inclination and directional orientation of the device. The unit 10 includes an outer hollow sealed non-magnetic housing or support structure 11, which may be formed of an upper inverted cup shaped section 12 closed at its lower end by a bottom wall 13, with a central tube 14 extending upwardly through the interior of the housing and being annularly sealed to both of the sections 11 and 13 at 15 and 16. The housing may be mounted with its axis 17 in a normally vertical position, but being movable to an inclined or tilted position such as that represented in FIG. 3 when a structure to which the device is mounted changes position. In the Figures, the device is illustrated as mounted to a vertically elongated member 18, which may extend through tube 14 in closely fitting relation and be secured rigidly thereto by a set screw 19 or the like. As seen in FIG. 4, member 18 may be a flexible cable or line extending between a buoy 20 on the surface of a body of water 21 and an anchor 22 on the floor of the ocean or the like, with a water current sensing unit 125 being connected rigidly to and disposed about tube 14 to function in conjunction with the device 10. Unit 125 senses the rate of water flow relative to housing 11, while the device 10 senses the inclination of housing 11 and the compass direction in which a particular point on the housing is facing. This inclination and direction information can then be utilized to correct the current flow information for inclination and housing orientation and thereby determine the true current conditions. The output signals from units 10 and 125 can be carried to the surface of the water by a multiple conductor cable 23 leading to electronic response and energizing circuitry 24 carried by the buoy. The sections 12, 13 and 14 of housing 11 are desirably formed of an insulative material, such as an appropriate resinous plastic substance.

Within the annular chamber 24 formed in the housing and about its central tube 14, there is provided a hollow non-magnetic coil carrying body 25 (typically formed of a resinous plastic material), which may have an inner vertical cylindrical wall 26 centered about axis 17 and received in close proximity to tube 14. An outer annular wall 27 of hollow annular body 25 may be curved spherically as shown about a center 28 located on normally vertical axis 17 of the device. Wall 27 may contain apertures 29 at various locations to provide communication between the interior and the exterior of body 25, with the entire chamber 24 at both the interior and exterior of body 25 being completely filled with an appropriate liquid, such as oil, acting to dampen movements of the later-to-be-described core structure 54, and acting also to positively and effectively prevent collapse of or damage to the housing and other parts under very high external pressure. For example, this liquid filled arrangement can permit use of a device embodying the invention at a location deep within an oil or gas well, where formation pressures as high as 10,000 p.s.i. or higher may be encountered. A non-magnetic bellows 30 may be expansible and contractible to compensate for expansion and contraction of the liquid within chamber 24, and the liquid may initially be filled into that chamber through a passage 31 ultimately closed and sealed by a non-magnetic seal screw 32.

Wound about the spherical body 25 are six coils, including four series connected power input or primary coils 33, 34, 35 and 36, and two output or secondary coils 37 and 38. An inclination coil 68 is wound about housing 11, with all of the input, output and inclination coils being flux-linked to a common annular core structure 54 movably mounted within hollow body 25. Referring to FIGS. 1 and 2, the first of the input coils 33 is wound about the left side of hollow annular body 25 as viewed in those figures. This coil 33 includes a number of turns each extending first downwardly at 39 along the inner side of inner wall 26 of body 25, radially between wall 26 and the central tube 14, and then curving upwardly at 40 to extend arcuately along the outer surface of outer wall 27 of part 25 to an upper location 41, at which the next turn of the coil extends downwardly along the inside of part 25, et cetera. The four input coils 33, 34, 35 and 36 are all wound in this same manner about part 25, but with their axial central planes 42 (FIG. 2) offset circularly ninety degrees from one another. The coil 33 may be considered as wound essentially about an axis 43 (FIG. 2), which is horizontal when axis 17 of the device is vertical. Similarly, the opposite coil 35 may be considered as wound essentially about a horizontal axis 44 parallel to axis 43. In like manner, the two coils 34 and 36 may be considered as wound essentially about two parallel horizontal axes 45 and 46, which are perpendicular to and intersect axes 43 and 44. The four input coils are connected in series in a manner giving them all the same relationship to annular body 25, so that when energized by the same electrical current they produce magnetic fields advancing about vertical axis 17 in a common direction. That is, these coils are connected in a series aiding relationship with respect to the annular magnetic core structure 54 contained within part 25.

The two output coils 37 and 38 are wound diametrically about part 25, rather than about only one side of that part in the manner of the input coils. More specifically, and again with reference to FIGS. 1 and 2, the output coil 38 consists of a number of turns which extend first upwardly and arcuately at 47 along the outside of input coil 33, then past a side of an upper portion of tube 14 at 48, and then downwardly and arcuately along the opposite side of part 25 at 49, past a lower portion of tube 14 at 50, then upwardly again at 47, et cetera, through the desired number of complete turns. This coil may be considered as centered essentially about a normally horizontal axis 51 lying in one of the planes 42, with the second output coil 37 being similarly wound diametrically about part 25 but at a location offset circularly ninety degrees, to be centered essentially about a normally horizontal axis 52.

Contained within hollow annular body 25 there is movably mounted the annular core structure 54, supported by a non-magnetic gimbal assembly 55 for universal pivotal movement about the previously mentioned center 28 of the device. Core structure 54 may typically include two upper and lower annular rings 56 of iron or other paramagnetic material secured to a carrier ring 57 which may be formed of brass or the like and may serve as the outer gimbal ring of assembly 55. An annular non-magnetic weight 58 may depend from and be rigidly secured to part 57, and carry non-magnetic screws 59 which are adjustable to preset the core rings 56 in a desired precisely level condition. The inner non-magnetic gimbal ring 60 is connected to outer ring 57 by a pair of aligned non-magnetic pivot pins 61 carried by ring 57 and projecting into recesses in a pair of jewel bearings 62 carried by ring 60, to thus mount ring 57 for pivotal movement about a first normally horizontal axis 63 extending through center 28. Similarly, the ring 60 is connected to a third non-magnetic gimbal ring 64 by non-magnetic pins 65 carried by ring 60 and projecting into recesses 66 in a pair of jewel bearings 66 carried by ring 64, to mount ring 60 for pivotal movement relative to ring 64 about a second normally horizontal axis 67 perpendicular to axis 63 and intersecting it at the center 28. The innermost ring 64 is rigidly secured to inner wall 26 of part 25 in any appropriate manner, and the part 25 and its carried coils are also suitably secured by adhesive or otherwise in fixed position relative to mounting tube 14. Each of the jewel bearings 62 and 66 is desirably spring urged within a retaining cup 162 against the engaged pivot pin by a spring 53 which permits a range of movement of the bearings (a in FIG. 9) relative to the cups 162 and the rings to which the cups are rigidly attached greater than the normal spacing b between adjacent rings, so that under shock forces the rings will contact one another before the springs bottom out (FIG. 10), thus protecting the bearings and pins against damage by such shock forces.

The paramagnetic core rings 56 are designed and selected to be capable of conducting only a relatively small amount of magnetic flux through these core elements, and more particularly are so designed that the portion of each core ring within each of the input coils becomes saturated with magnetic flux during each half cycle of the periodically fluctuating current (preferably alternating current) through that coil. This saturation occurs at a time well before the potential of the fluctuating current reverses polarity. The paramagnetic rings 56 are of a material which can easily be reversed in polarity and repeatedly saturated as discussed by the magnetic field produced by the alternating current in the input coils in any position to which the device may be tilted, such as for example, the FIG. 3 position. The flux linkage between the coils and core elements remains essentially the same in all such positions.

The coil 68 for rendering the device responsive to changes in inclination of housing 11 and the inner tube 14, as well as the carrying center post or line 18, is fixed relative to the housing and is wound about and desirably centered with respect to the main normally vertical axis 17 of the housing. It is contemplated that coil 68 may if desired be wound about the same hollow body 25 which carries the other coils 33 through 38, but in the drawings coil 68 has been typically illustrated as wound about the outer cylindrical axially extending wall 12 of housing 11. As seen, coil 68 is desirably positioned so that the paramagnetic core 54 is in all of its positions received directly within coil 68, and thus at a location at which flux produced by the coil extends directly parallel to axis 17. The coil 68 may be protected at its outer side by reception or encapsulation within an annular layer of protective material 69, typically an appropriate electrically insulative resinous plastic material enclosing and sealing the coil against contact with water or any other material received at the outside of the housing. Coil 68 is energized by a direct current power source 70 (FIG. 7) of a value such that the horizontal components of the magnetic field produced by coil 68 will be of the same general order of magnitude as the horizontal components of the earth's magnetic field, so that meaningful responses representing both of these types of fields can be obtained from the output coils. The circuit from power source 70 to inclination coil 68 is closed whenever it is desired that inclination information be included in the output from the device, and is opened when it is desired that only directional information be produced. The power supply circuit to coil 68 may be controlled by a manually operated switch, but preferably is controlled automatically by a transistor or other switching element represented at 71 in FIG. 7 acting to intermittently energize and de-energize coil 68.

Figure 7:
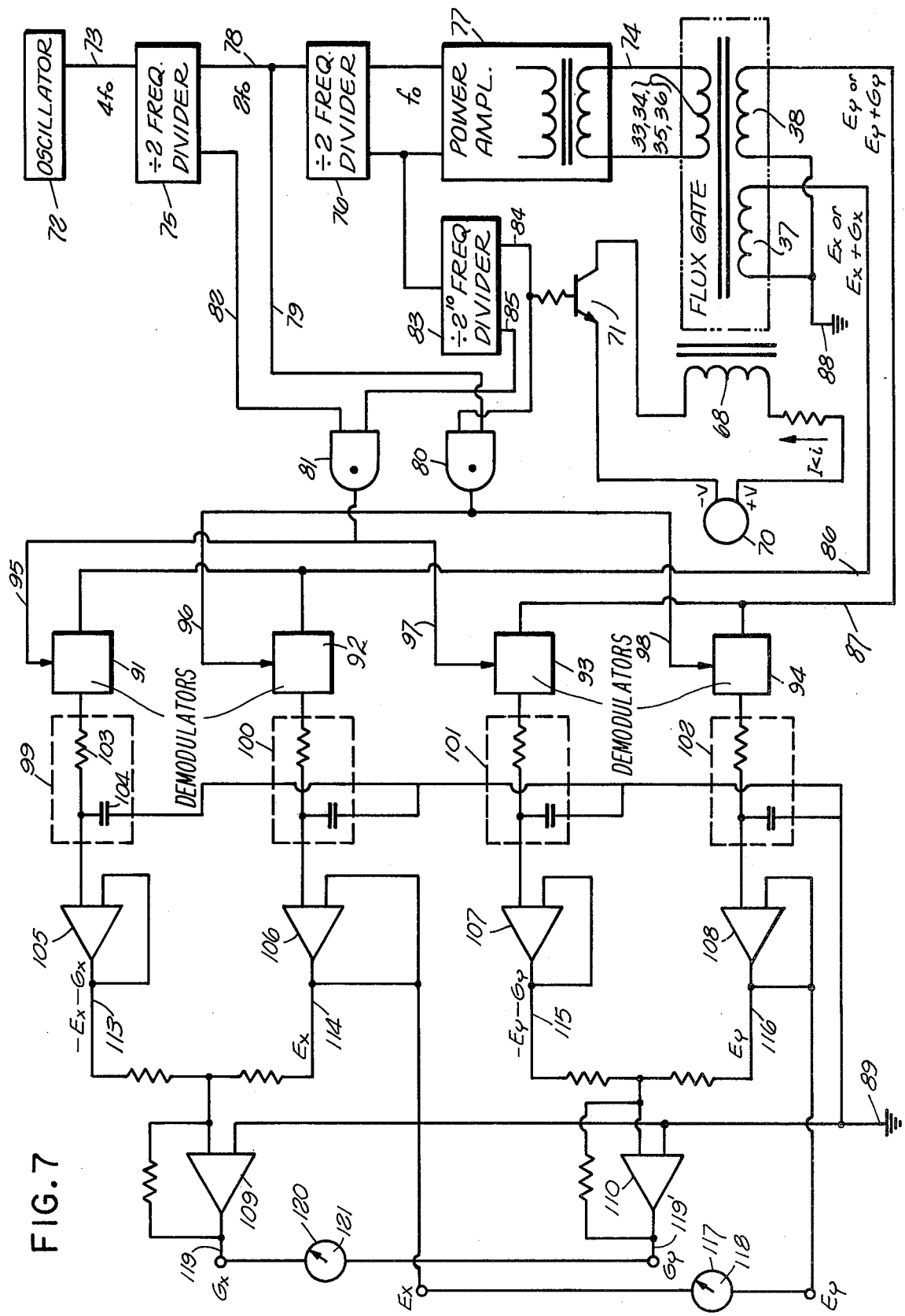
FIG. 7 is a schematic diagram of one electronic circuit which can be utilized with the device.

In the particular typical circuit illustrated schematically in FIG. 7, alternating current for energizing input coils 33 through 36 is derived from an oscillator 72, which preferably produces an alternating current in line 73 of a frequency four times the frequency $f_o$ ultimately delivered through lines 74 to flux gate input coils 33, 34, 35 and 36. As an example, the frequency of the alternating current produced by oscillator 72 may be 8 kilohertz, with the frequency in lines 74 then being 2 kilohertz. The 8 kilohertz frequency ($4f_o$) in line 73 may be first divided in half by a frequency divider 75, and then divided in half again by a second frequency divider 76, from which the alternating current at frequency $f_o$ may pass through a power amplifier 77 for ultimate delivery to coils 33 through 36. The alternating current of frequency $2f_o$ which is delivered through line 78 from frequency divider 75 to frequency divider 76 is also fed through a line 79 to a first of two And Gates 80 and 81, with a complementary output of divider 78 (180° out of phase with that in line 78) being fed through a line 82 to the second And Gate. A complementary output from the second frequency divider 76 may be fed to a frequency divider 83 (typically dividing the frequency by a relatively high number such as $2^{10}$) with a first output 84 from frequency divider 83 acting to turn transistor 71 on and off once during each cycle of the relatively low frequency output from divider 83. The two mutually complementary outputs in lines 84 and 85 from frequency divider 83 are also delivered to the And Gates 80 and 81 respectively as their second inputs.

The two flux gate output coils 37 and 38 are connected by lines 86 and 87, and ground connections 88–89, to four synchronous second harmonic demodulators 91, 92, 93 and 94 which are turned on and off by And Gates 80 and 81 by signals conducted through lines 95, 96, 97 and 98 in a manner to be discussed in detail hereinbelow. Connected into the circuits from the four demodulators are four smoothing filters 99, 100, 101 and 102, each including a resistance 103 and capacitor 104. The outputs from the filters are delivered to four buffer amplifiers 105, 106, 107 and 108, functioning as sample and hold circuits, with the outputs of the upper and lower pairs of the buffer amplifiers as seen in FIG. 7 being added together by summing amplifiers 109 and 110.

Figure 8:
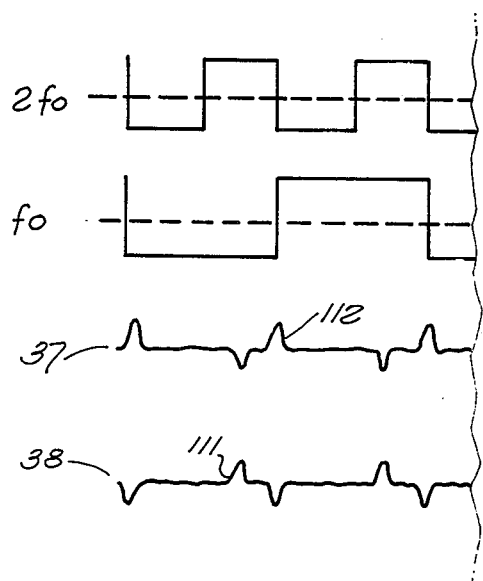
FIG. 8 shows certain of the wave forms in the FIG. 7 circuit.

To describe a cycle of operation of the apparatus illustrated in FIGS. 1 through 7, assume that oscillator 72 is in operation and is energizing the four input coils 33 thorugh 36 in series, so that these coils alternately produce magnetic fields extending in opposite circular directions within core rings 56. The magnetic fields thus produced by the input coils are supplemented or biased by the horizontal component of the earth's magnetic field, extending in a north to south direction, and when transistor 71 is turned on by horizontal components of the magnetic field produced by inclination coil 68. Assuming first of all that transistor 71 is turned off, and the core is biased only by the earth's magnetic field, it will be noted that during one-half cycle of the alternating current in coils 33 through 36, the horizontal component of the earth's magnetic field aids the field produced by input coils 33 through 36 in core elements 56 at one side of axis 17, and reduces the field produced by the input coils at the opposite side of axis 17. When one of the output coils 37 or 38 is positioned to extend in an east to west direction (the direction of coil 38 in FIG. 2), the discussed effects of the earth's magnetic field are maximized in the portions of the core rings extending through coil 38, so that one of those portions reaches saturation before the other and the difference in saturation times causes a periodically fluctuating output voltage signal to be induced in coil 38 at a frequency which is the second harmonic of the frequency $f_o$ in flux gate input coils 33 through 36. This output signal in coil 38 is represented at 111 in FIG. 8. When one of the output coils is in a position of extension in a north to south direction (coil 37 in the position typically illustrated in FIG. 2), the earth's magnetic field has no effect on the portions of the core elements received within that coil and there is consequently no difference in the saturation times of those core portions, with the resultant development of no output signal in coil 37. As will be understood, when the device turns to any intermediate position in which coils 37 and 38 are both disposed at an angle to the magnetic north to south direction, electrical output signals will be induced in both the output coils, representing two components of the horizontal component of the earth's magnetic field. The two lower pulse form diagrams of FIG. 8 represent the second harmonic outputs in coils 37 and 38 when the coils are in such an intermediate position in which signals are developed in both coils whose magnitudes represent two components of the earth's horizontal field.

When inclination coil 68 is energized, by closure of transistor 71, the outputs of coils 37 and 38 represent two horizontal components of a combination biasing field which consists of the earth's horizontal field and the horizontal components of the field produced by inclination coil 68. Thus, the outputs of coils 37 and 38 then contain both directional and inclination information added together. The demodulators 91, 92, 93 and 94, together with smoothing filters 99, 100, 101 and 102, buffer amplifiers 105, 106, 107 and 108, produce in the output lines 113, 114, 115 and 116 from the buffer amplifiers continuous direct current voltage signals proportional in value to the second harmonic signals in coils 37 and 38. And circuit 80 turns demodulators 92 and 94 on only when coil 68 is de-energized, so that the outputs in lines 114 and 116 represent the two components $E_x$ and $E_y$ of the earth's horizontal field. Because of the sample and hold characteristics of the circuitry, as previously discussed, these output signals in lines 114 and 116 are maintained continuously, even during the times when demodulators 92 and 94 are turned off. The second And circuit 81 turns demodulators 91 and 93 on only when inclination coil 68 is energized, so that the continuous direct current outputs in lines 113 and 115 represent two components respectively of the combined horizontal field produced by the earth's flux and that of inclination coil 68. The two complementary inputs in lines 79 and 82 to the And circuits cause the outputs in lines 113 and 115 to be negative with respect to the outputs in lines 114 and 116. Consequently, the signal in line 114 may be considered as representing $E_x$, while the signal in line 113 represents $-E_x-G_x$ (where $G_x$ is a horizontal component of the field of coil 68). Similarly, the signal in line 116 represents $E_y$, while the signal in line 115 represents $-E_y-G_y$ ($G_y$ being the second horizontal component of the field of coil 68).

The two directional component signals in lines 114 and 116 are conducted to a vector resolver 117 where they are combined to give an indication of the directional orientation of the coil assembly with respect to magnetic north. Thus, vector resolver 117 or any other unit responsive to the signals representing the earth's field horizontal components can indicate on a compass card 118 the compass direction in which a particular predetermined index point on unit 10 is facing. Alternatively, the unit 117 may in some installations be a power operated steering unit in an autopilot assembly, acting to compensate automatically for changes in heading of a boat or other craft, or may be any other unit automatically responsive to directional changes.

Summing amplifier 109 adds together the outputs in lines 113 and 114, to produce in a line 119 a constant direct current voltage signal representing one horizontal component of the field of coil 68, and thus representing a component of the inclination of unit 10. Similarly, summing amplifier 110 adds together the outputs in lines 115 and 116, to produce a direct current signal representing a second component of the inclination of the device. The outputs from the two summing amplifiers may be directed to a second vector resolver 120 or other unit acting to combine the two components of inclination and thus indicate on a card 121 or other display element of resolver 120 the angle of that inclination (angle T in FIG. 3).

Accurate indications of both azimuth direction and inclination are produced at resolvers 117 and 120 in spite of movement of the primary and secondary coils 33 through 38 to inclined positions with the housing of unit 10, since in all such positions the core elements 56 automatically pivot about the gimbal center 28 to remain in a level position in which only horizontal components of the earth's field and the field of coil 68 affect the output of the device.

Though the electrical and magnetic characteristics of the various elements of the device may of course be varied within wide limits to satisfy any particular operating situation, the following example is given as a typical coil and core arrangement which may be employed:

1. Input coils 33, 34, 35 and 36—fifty turns each of 34 gauge copper wire.
2. Output coils 37 and 38—200 turns each of 41 gauge copper wire.
3. Core rings 56—each formed of mumetal having a thickness of 5 mils (all other parts of the entire device formed of non-magnetic material).
4. Inclination coil 68—400 turns of 39 gauge copper wire.

In the arrangement of FIGS. 1 to 10, there may be substituted for the input coils 33 through 36 one continuous annular coil extending about the entire annular extent of the core structure. Alternatively, it may be possible in some instances to utilize only a single input coil at one side of the core, or to employ other input coil arrangements capable of producing the desired magnetic field in the core.

Figure 11:
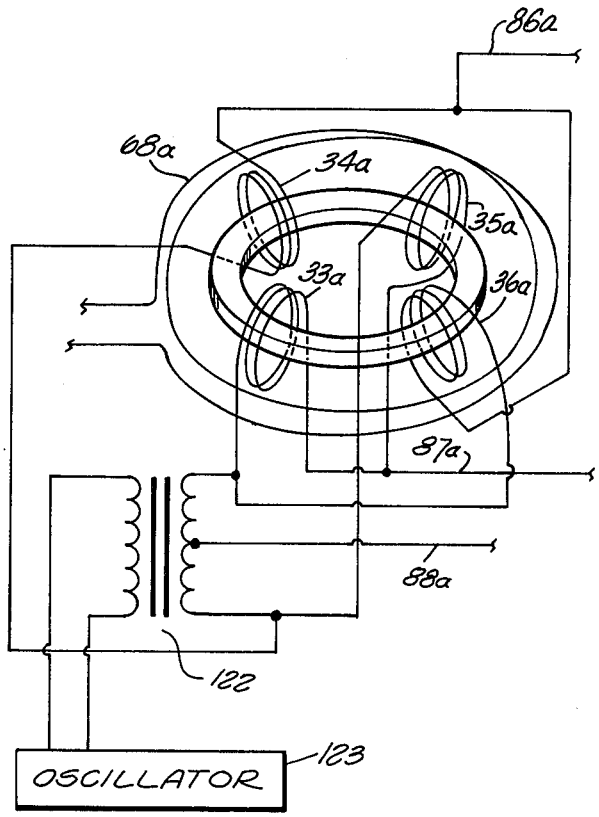
FIG. 11 is a view similar to FIGS. 5 and 6 but showing a variational winding arrangement.

FIG. 11 shows a variational arrangement in which there are substituted for the input and output coils 33 through 38 only four coils 33a, 34a, 35a and 36a, connected in a bridge relationship as discussed in my prior U.S. Pat. No. 3,888,201, and with an inclination coil 68a extending about the core and coil assembly in the manner of coil 68 of the first form of the invention. The four coils 33a, 34a, 35a and 36a may be constructed and mounted exactly the same as input coils 33 through 36 of FIGS. 1 to 10, being wound about a body such as that shown at 25 and about a relatively universally pivotal core structure 54a corresponding to core 54 of the first form of the invention. As in my prior patent, the two coils 33a and 35a are connected in series aiding relation across the output coil of a transformer 122 energized by an oscillator 123. Similarly, the two opposed coils 34a and 36a are connected in series aiding relation across the same output coil of transformer 70 (i.e., all coils 33a to 36a produce MMF in the same circular direction). Coil 68a when energized produces a normally vertical magnetic field of the same type as coil 68 in the first form of the invention, with the horizontal components of that field being utilized to produce inclination component signals in the outputs from the coils 33a through 36a. The three lines designated 86a, 87a and 88a contain output signals from the flux gate coils corresponding to the signals in lines 86, 87 and 88 respectively of FIG. 7, which signals can be utilized to operate two resolvers or other indicators such as those shown at 117 and 120 in FIG. 7 for displaying direction and inclination information. As seen in FIG. 11 the output line 86a is connected to a midpoint between coils 34a and 36a, and the output line 87a is connected to a midpoint between coils 33a and 35a, while line 88a is connected to the center tap of the secondary coil of transformer 122.

It is contemplated that either of the forms of the invention may be employed to give only directional information or only inclination information if desired. For example, if inclination by itself will satisfy the requirements of a particular situation, the device 10 can be shielded from the effects of the earth's magnetic field, as by placing the unit within a housing of paramagnetic material, so that the only field to affect the flux gate coils will be the horizontal component of the normally vertical but inclinable field produced by coil 68 or 68a. It will of course be understood that in such event some portions of the circuitry of FIG. 7 which are useful only in producing a directional output become superfluous and may if desired be omitted.

The two inclination component signals $G_x$ and $G_y$ in lines 119 and 119' of FIG. 7 have the following values:

$$G_x = KI \sin T \cos P$$

$$G_y = KI \sin T \sin P$$

where —
K is a circuit constant
I is the current energizing inclination coil 68 or 68a
T is the angle of inclination or tilt between axis 17 and the true vertical
P is the "high side angle," i.e., the angle through which housing 11 of unit 10, in any inclined position, is turned about its axis 17 from a zero high side angle position in which a predetermined index point on the housing is at its highest setting.

From these relationships, we can derive an expression for the inclination T as follows:

$$G_y/G_x = \sin P/\cos P = \tan P$$

$$P = \tan^{-1}(G_y/G_x)$$

$$\sqrt{G_y^2 + G_x^2} = KI\sqrt{\sin^2 T[\cos^2 P + \sin^2 P]}$$

$$\sqrt{G_y^2 + G_x^2} = KI \sin T$$

$$T = \sin^{-1}[\sqrt{G_y^2 + G_x^2}/KI]$$

A fair approximation is:

$$T \simeq \sqrt{G_y^2 + G_x^2}/KI$$

The resolver 120 or other unit substituted therefor is constructed to apply one of these formulas to obtain the desired output giving the value of T.

In addition to or in lieu of the inclination and direction outputs discussed above, unit 24 of FIG. 4 may also include circuitry for developing any other desired type of readout which is derivable by standard trigonometric or other mathematical procedures from the outputs of the direction and inclination coils. For example, it is desired in some situations that the readout unit contain computer circuitry programmed to calculate the "high side angle" P according to the formula:

$$P = \tan^{-1}(G_y/G_x)$$

and contain computer circuitry programmed to calculate the direction in which axis 17 is inclined (the azimuth of the inclination by the formula:

$$A = \tan^{-1}(E_x/E_y)$$

where $E_x$ and $E_y$ are as defined hereinabove.

Such additional outputs are especially helpful when devices embodying the invention are utilized in well drilling applications.

While certain specific embodiments of the present invention have been disclosed as typical, the invention is of course not limited to these particular forms, but rather is applicable broadly to all such variations as fall within the scope of the appended claims.

I claim:
1. Inclination and direction responsive apparatus comprising:
a source of periodically fluctuating electrical current;
a support movable between a predetermined position of zero inclination in which an axis fixed relative to the support extends directly vertically and positions in which the axis is inclined at different angles;
a flux gate assembly carried by said support and subjected to an ambient magnetic field and energized by said current and acting to produce an output which varies in response to changes in directional orientation of said support relative to the field;
said assembly including magnetic core means mounted for leveling movement relative to said support to remain level in differently inclined positions of the support, and periodically driven to magnetic saturation by said current, with the time of saturation being altered by said ambient field; and coil means flux linked to said core means in a relation producing said output varying with directional orientation;
an inclination coil carried by said support for movement therewith and flux linked to said flux gate assembly and energized to produce a magnetic field which extends essentially along said axis of the location of the flux gate assembly and tilts to differently inclined positions with the support and produces an output from the flux gate assembly which varies in response to changes in inclination;
means for selectively energizing or de-energizing said inclination coil in a relation producing a signal representing both direction and inclination when said inclination coil is energized, and producing a signal representing only direction when the inclination coil is de-energized; and
processing means for combining said signals representing both direction and inclination with said signal representing only direction to produce an output representing only inclination.

2. Inclination and direction responsive apparatus as recited in claim 1, in which said inclination coil extends about said core means and coil means of the flux gate assembly and is centered essentially about said axis which extends vertically in said position of zero inclination of the support.

3. Inclination and direction responsive apparatus as recited in claim 1, including a universal connection mounting said core means for said leveling movement relative to said support.

4. Inclination and direction responsive apparatus as recited in claim 1, in which said coil means are fixed relative to said support for movement therewith to positions of different inclination, and said core means are spaced from said coil means in a relation leaving room for leveling movement of the core means relative to the coil means as the latter move with the support to positions of different inclination.

5. Inclination and direction responsive apparatus as recited in claim 1, in which said core means form a closed loop of paramagnetic material centered essentially about said axis when the axis is in vertically extending position.

6. Inclination and direction responsive apparatus as recited in claim 1, in which said support includes a housing containing said core means and said coil means of the flux gate assembly, said inclination coil being wound about said housing and centered about said axis.

7. Inclination and direction responsive apparatus as recited in claim 1, in which said support contains a passage extending essentially along said axis and about which the core means and coil means are positioned, and through which an elongated member may extend for attachment to said support.

8. Inclination and direction responsive apparatus as recited in claim 1, including a buoy, a line extending downwardly from said buoy, and means mounting said support to said line.

9. Inclination and direction responsive apparatus as recited in claim 1, in which said support includes a housing containing a central tube extending essentially along said axis and about which said coil means and core means are carried, a buoy, and a line extending downwardly from the buoy and extending through said tube and connected thereto.

10. Inclination and direction responsive apparatus as recited in claim 1, in which said core means form a loop of paramagnetic material extending essentially about said axis, said coil means including at least one input coil encircling the material of said loop form core means at a side of said axis and energized by said periodically fluctuating current to periodically saturate the core.

11. Inclination and direction responsive apparatus as recited in claim 1, in which said core means form a closed loop of paramagnetic material centered essentially about said axis, said coil means including four coils extending about the material of said loop of paramagnetic material at evenly circularly spaced locations and connected to said source for energization by said fluctuating current.

12. Inclination and direction responsive apparatus as recited in claim 1, in which said core means form a closed loop of paramagnetic material centered essentially about said axis and mounted for universal pivotal leveling movement relative to said support, said coil means including input coil means wound about the material of said loop and energized by said fluctuating current and producing flux extending along an endless path through the closed loop of material, and a pair of output coils encircling the loop of paramagnetic material essentially diametrically at locations offset approximately 90 circular degrees from one another, and producing different components of said outputs.

13. Inclination and direction responsive apparatus as recited in claim 1, in which said core means form a closed loop of paramagnetic material extending essentially about said axis, said coil means including two output coils extending essentially diametrically about said loop of paramagnetic material and offset circularly from one another, and producing different components of said outputs.

14. Inclination and direction responsive apparatus as recited in claim 1, in which said core means form essentially a closed loop of paramagnetic material, and said coil means include two pairs of coils disposed about said loop with the coils of each pair at diametrically opposite locations and connected in series but reversely to said fluctuating current, and with each pair offset essentially 90° from the other pair, there being output leads deriving output signals from midpoints between the coils of the two pairs.

15. Inclination and direction responsive apparatus as recited in claim 1, in which said support includes a housing containing a central mounting post extending essentially along said axis, there being a hollow essentially annular coil mounting structure in said housing and extending about said center post, said coil means including input coils wound about said core mounting structure with each turn of said input coils located entirely at one side of said axis, and with said input coils connected to said fluctuating current for energization thereby, said coil means including two output coils wound essentially diametrically about said coil mounting structure with their centers offset essentially 90 circular degrees from one another and producing two components of an output signal, said inclination coil extending about the outside of said input and output coils and essentially about said axis, said core means being an essentially annular core of paramagnetic material located in said hollow coil mounting structure, there being a universal connection in the coil mounting structure mounting said core for universal pivotal movement relative to said input and output coils and said inclination coil.

16. Inclination and direction responsive apparatus as recited in claim 1, in which said support includes a housing within which said core means are mounted for said leveling movement and which is completely filled with liquid to positively resist collapse under high pressures externally of the housing.

17. Inclination and direction responsive apparatus as recited in claim 1, in which said means for selectively energizing and de-energizing said inclination coil include means for energizing and de-energizing said coil automatically and intermittently.

18. Inclination and direction responsive apparatus comprising:
a source of periodically fluctuating electrical current;
a support movable between a predetermined position of zero inclination in which an axis fixed relative to the support extends directly vertically and positions in which the axis is inclined at different angles;
a flux gate assembly carried by said support and subjected to an ambient magnetic field and energized by said current and acting to produce an output which varies in response to changes in directional orientation of said support relative to the field;
said assembly including magnetic core means mounted for leveling movement relative to said support to remain level in differently inclined positions of the support, and periodically driven to magnetic saturation by said current, with the time of saturation being altered by said ambient field; and coil means flux linked to said core means in a relation producing said output varying with directional orientation;

an inclination coil carried by said support for movement therewith and flux linked to said flux gate assembly and energized to produce a magnetic field which extends essentially along said axis at the location of the flux gate assembly and tilts to differently inclined positions with the support and produces an output from the flux gate assembly which varies in response to changes in inclination;

means for automatically and intermittently energizing and de-energizing said inclination coil in a relation producing a signal representing both the direction and inclination outputs combined when said inclination coil is energized, and producing only a direction indicating output when the inclination coil is de-energized; and means for subtracting said direction indicating output from said combined output which represents both inclination and direction, to produce an output representing only inclination.

19. Inclination and direction responsive apparatus comprising:

a source of periodically fluctuating electrical current;

a support movable between a predetermined position of zero inclination in which an axis fixed relative to the support extends directly vertically and positions in which the axis is inclined at different angles;

a flux gate assembly carried by said support and subjected to an ambient magnetic field and energized by said current and acting to produce an output which varies in response to changes in directional orientation of said support relative to the field;

said assembly including magnetic core means mounted for leveling movement relative to said support to remain level in differently inclined positions of the support, and periodically driven to magnetic saturation by said current, with the time of saturation being altered by said ambient field; and coil means flux linked to said core means in a relation producing said output varying with directional orientation;

an inclination coil carried by said support for movement therewith and flux linked to said flux gate assembly and energized to produce a magnetic field which extends essentially along said axis at the location of the flux gate assembly and tilts to differently inclined positions with the support and produces an output from the flux gate assembly which varies in response to changes in inclination;

said source including an oscillator delivering alternating current to said flux gate assembly;

said coil means including input coil means and two output coils flux linked to said core and offset 90 circular degrees from one another;

circuitry timed by said oscillator and acting to intermittently energize and de-energize said inclination coil;

a first pair of output circuits connected to said two output coils when said inclination coil is energized and producing outputs representing both inclination and direction in combination;

a second pair of output circuits connected to said output coils when said inclination coil is de-energized and producing outputs representing direction alone; and means for subtracting said second outputs from said first outputs to produce third outputs representing inclination alone.

20. Inclination and direction responsive apparatus as recited in claim 1, in which said source includes an oscillator delivering alternating current to said flux gate assembly, said coil means including input coil means and two output coils flux linked to said core and offset 90 circular degrees from one another, said means for energizing and de-energizing said inclination coil including circuitry timed by said oscillator and acting to intermittently energize and de-energize said inclination coil, there being a first pair of output circuits connected to said two output coils when said inclination coil is energized and producing said signal representing both inclination and direction in combination, and a second pair of output circuits connected to said output coils when said inclination coil is de-energized and producing said signal representing direction alone.

* * * * *